(12) United States Patent
Eiselt

(10) Patent No.: US 7,391,559 B2
(45) Date of Patent: Jun. 24, 2008

(54) APPARATUS AND METHOD FOR RAMAN GAIN SPECTRAL CONTROL

(75) Inventor: Michael H. Eiselt, Middletown, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

(21) Appl. No.: 11/515,309

(22) Filed: Aug. 31, 2006

(65) Prior Publication Data

US 2007/0008610 A1   Jan. 11, 2007

Related U.S. Application Data

(63) Continuation of application No. 10/454,773, filed on Jun. 3, 2003.

(60) Provisional application No. 60/385,921, filed on Jun. 4, 2002.

(51) Int. Cl.
*H01S 4/00* (2006.01)
*H04B 10/12* (2006.01)

(52) U.S. Cl. ..................... 359/334
(58) Field of Classification Search .............. 359/334
See application file for complete search history.

(56) References Cited

U.S. PATENT DOCUMENTS

| 6,519,082 | B2 * | 2/2003 | Ghera et al. | 359/341.4 |
|---|---|---|---|---|
| 6,532,101 | B2 * | 3/2003 | Islam et al. | 359/334 |
| 6,611,370 | B2 * | 8/2003 | Namiki et al. | 359/334 |
| 6,624,926 | B1 * | 9/2003 | Hayashi et al. | 359/334 |
| 6,674,568 | B2 * | 1/2004 | Liu | 359/334 |
| 6,724,524 | B1 * | 4/2004 | Evans et al. | 359/334 |
| 6,785,042 | B1 * | 8/2004 | Onaka et al. | 359/334 |
| 6,859,306 | B2 * | 2/2005 | Fishman et al. | 359/334 |
| 6,891,661 | B2 * | 5/2005 | Hayashi et al. | 359/334 |
| 2003/0169479 | A1 * | 9/2003 | Liu | 359/334 |
| 2005/0024714 | A1 * | 2/2005 | Hayashi et al. | 359/334 |

* cited by examiner

*Primary Examiner*—Jack Keith
*Assistant Examiner*—Eric Bolda
(74) *Attorney, Agent, or Firm*—Woodcock Washburn LLP

(57) ABSTRACT

The invention pertains to optical fiber transmission systems, and is particularly relevant to optical transport systems employing Raman optical amplifiers. In particular the invention teaches an apparatus and method to provide initial tuning of a Raman pump module. In the present invention, improvements to Raman gain control are taught in order to provide for an advantageous Raman gain spectral profile.

29 Claims, 2 Drawing Sheets

APPARATUS AND METHOD FOR RAMAN GAIN SPECTRAL CONTROL

CROSS-REFERENCE TO RELATED APPLICATIONS

This application is a continuation of U.S. Pat. application Ser. No. 10/454,773 filed Jun. 3, 2003, which claims the benefit of U.S. Provisional Application No. 60/385,921, filed Jun. 4, 2002.

TECHNICAL FIELD OF THE INVENTION

The present invention relates, in general, to the field of optical communications, and in particular to, an optical transport system that uses Raman optical amplifiers. In particular the invention teaches an apparatus and method to provide initial tuning of a Raman pump module. In the present invention, improvements to Raman gain control are taught in order to provide for an advantageous Raman gain spectral profile.

BACKGROUND OF THE INVENTION

A goal of many modern long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalent wavelength, co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Typical long haul optical transport dense wavelength division multiplexed (DWDM) systems transmit 40 to 80 10 channels at Gbps (gigabit per second) across distances of 3000 to 6000 km in a single 30 nm spectral band. A duplex optical transport system is one in which traffic is both transmitted and received between parties at opposite end of the link. In current DWDM long haul transport systems transmitters different channels operating at distinct carrier frequencies are multiplexed using a multiplexer. Such multiplexers may be implemented using array waveguide grating (AWG) technology or thin film technology, or a variety of other technologies. After multiplexing, the optical signals are coupled into the transport fiber for transmission to the receiving end of the link.

At the receiving end of the link, the optical channels are de-multiplexed using a de-multiplexer. Such de-multiplexers may be implemented using AWG technology or thin film technology, or a variety of other technologies. Each channel is then optically coupled to separate optical receivers. The optical receiver is typically comprised of a semiconductor photodetector and accompanying electronics.

The total link distance may in today's optical transport systems be two different cities separated by continental distances, from 1000 km to 6000 km, for example. To successfully bridge these distances with sufficient optical signal power relative to noise, the total fiber distance is separated into fiber spans, and the optical signal is periodically amplified using an in line optical amplifier after each fiber span. Typical fiber span distances between optical amplifiers are 50-1000 km. Thus, for example, 30 100 km spans would be used to transmit optical signals between points 3000 km apart. Examples of inline optical amplifers include erbium doped fiber amplifers (EDFAs) and semiconductor optical amplifiers (SOAs).

Alternatively, a Raman optical amplifier may be used to boost the optical signal power. Most Raman optical amplifiers comprise at least one high power pump laser that is launched into the fiber span. Through the nonlinear optical process of stimulated Raman scattering in the $SiO_2$ of the glass of the fiber span, this pump signal provides gain to the optical signal power. A Raman amplifier may be co-propagating or counter-propagating to the optical signal, and a common configuration is to counter-propagate the Raman pump. A Raman amplifier may be used alone, or in combination with an alternate example of an inline optical amplifier, such as an EDFA. For example, a Raman amplifier may be used in conjunction with an inline optical amplifier to accommodate high loss spans and to bring the net span loss within an allowable system dynamic range.

The gain profile of Raman gain in an optical fiber is not spectrally flat, and it would be desirable to achieve control over the Raman pump source in order to achieve a spectrally flat Raman gain. It is further desirable to be able to control the gain profile of the Raman gain in order to achieve a spectral dependence that may not necessarily be flat, but may be advantageous in other regards.

The power of the Raman pumps can be designed (e.g. by simulations) to yield flat (or arbitrarily shaped) gain for a nominal (typical) fiber span. But two parameters of the real fiber are random and unknown: 1) the wavelength dependent coupling loss between pump laser and fiber input and 2) the wavelength dependent loss of the fiber. To compensate for these unknowns, the pump powers need to be adapted.

One way to obtain the correct pump power values is to measure the spectral gain shape and adapt the power values for flat gain shape. But that requires expensive channel power monitors (measuring wavelength resolved power values) it also requires signals present at all wavelengths which may not be possible in some systems where all channels are not equiped. The present invention discloses a solution that is based on simple (overall) power measurements and only requires a single channel in the system to be active.

SUMMARY OF THE INVENTION

In the present invention, improvements to Raman gain control are taught in order to provide for an advantageous Raman gain spectral profile.

In one aspect of the invention, an apparatus to achieve a flat Raman gain profile is taught using a plurality of Raman pump lasers.

In another aspect of the invention, an apparatus to achieve an advantageously shaped Raman gain profile is taught using a plurality of Raman pump lasers.

In another aspect of the invention, a method to achieve a flat Raman gain profile is taught using a plurality of Raman pump lasers.

In another aspect of the invention, a method to achieve an advantageously shaped Raman gain profile is taught using a plurality of Raman pump lasers.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
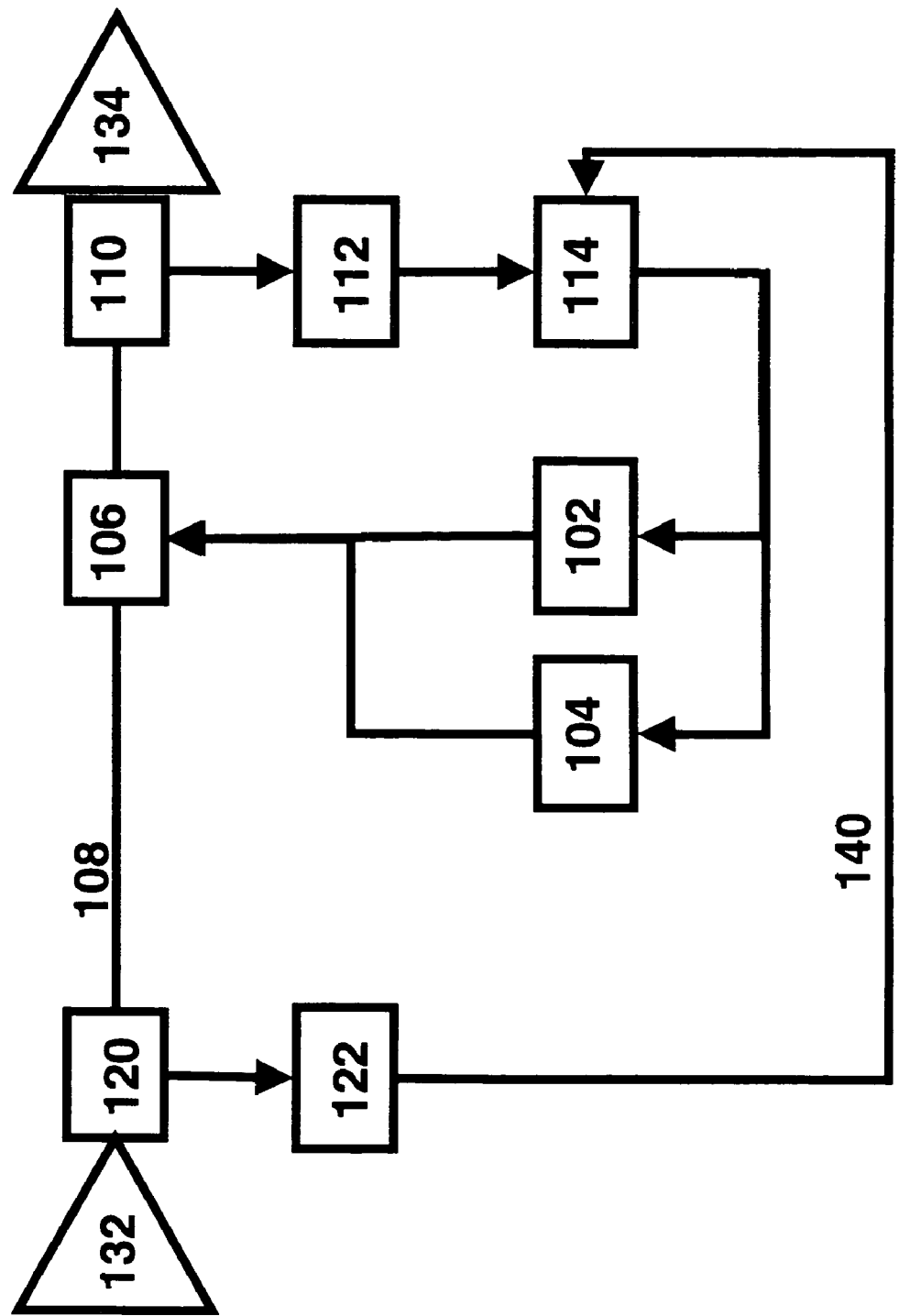
FIG. 1 is a schematic illustration of a Raman gain control apparatus to achieve an advantageously shaped Raman gain spectral profile.

In FIG. 1 is shown a block diagram of a Raman gain control apparatus to achieve an advantageously shaped Raman gain spectral profile. The Raman gain control apparatus comprises a plurality of Raman pump lasers. Shown in FIG. 1 are Raman pump laser 102 and Raman pump laser 104. Raman pump laser 102 and Raman pump laser 104 are optically coupled to wavelength selective coupler 106. Wavelength selective coupler 106 is further optically coupled to fiber span 108 and optical tap 110. The apparatus also comprises optical power meter 112, and a Raman gain control unit 114. In FIG. 1 is shown optical tap 120 and optical power meter 122. Power meter 122 is coupled to control unit 114 by communication link 140. Optical tap 120 is coupled to the opposite end of fiber span 108 from wavelength selective coupler 106. Also shown for reference in FIG. 1 is in-line optical amplifier 132 and in-line optical amplifier 134.

Raman pump laser 102 and Raman pump laser 104 may be implemented as a sufficiently powerful laser such as a high power semiconductor diode lasers, or a plurality of high power semiconductor lasers. The plurality of high power semiconductor lasers may be of the same wavelength. In the context of this invention, it will be understood that Raman pump laser 102 and Raman pump laser 104 will be purposefully at different wavelengths to provide uniform or otherwise tailored Raman gain across a broad spectrum. It should be noted that while FIG. 1 shows a preferred embodiment with two Raman pump lasers with respectively two emission wavelengths, this invention allows more than two Raman pump lasers with more than two emission wavelengths.

Wavelength selective coupler 106 may be realized as a thin film optical coupler or other technology so long as the optical coupler acts to couple the Raman pump laser signals into to fiber span 108, while allowing the optical data signal to proceed from fiber span 108 towards in-line amplifier 134. Optical fiber span 108 may be implemented using optical fiber, and in a preferred embodiment is single mode fiber such as SMF-28 or LEAF. Typical distances for fiber span 108 are 75-125 km. In a preferred embodiment of the invention, a Raman amplifier can be used on every link in the transmission system to reduce the amplifier noise figure and enable more spans for the longer fiber spans with higher losses.

Optical tap 110 and optical tap 120 may be fused couplers, or thin film couplers. Alternatively, wavelength selective coupler 106 may be a circulator. Optical power meter 112 and optical power meter 122 may be a calibrated photodiode. Raman gain control unit 114 may be a microprocessor, or microcomputer, and fulfills the feedback loop between the optical power meter 112, optical power meter 122 and Raman pump laser 120. In particular, feedback loop 140 connects optical power meter 122 and Raman gain unit 114. In a preferred embodiment, feedback loop 140 may be implemented though the optical service channel of the optical transport system. Examples of inline optical amplifier 132 and optical amplifier 134 include erbium doped fiber amplifiers (EDFAs) and semiconductor optical amplifiers (SOAs). Potentially a discrete Raman amplifier may also be used for in-line optical amplifier 132 and in-line optical amplifier 134.

FIG. 1 may now be used to understand the operation of the invention to control the spectral dependence of the Raman gain. For example, to achieve a spectrally flat gain, two pump wavelengths may be used with the correct relative power ratio between Raman pump laser 102 and Raman pump laser 104. However, power losses in the pump coupling components, for example wavelength selective coupler 106 and fiber losses, can be wavelength dependent, causing the signal from Raman pump laser 102 to be attenuated differently than the signal from Raman pump laser 104. If the relative pump launch powers are not adjusted to take into account these loss variations, this can lead to a non-flat Raman gain spectrum.

Consider first the case where both Raman pump laser 102 and Raman pump laser 104 are turned off. For an optical signal, at $\lambda$ signal traveling from optical tap 120 to optical tap 110, the inherent loss in the fiber span is equal to $L_0 = P_1/P_2$ where $P_2$ is the power as measured in optical power meter 112 and $P_1$ is the power as measured in optical power meter 122. Raman gain control unit 114 is programmed to calculate $L_0$ based on power measurements from optical power meter 112 and optical power meter 122 when Raman pump laser 102 and 104 are off.

The second case is where Raman pump laser 102, operating at wavelength $\lambda_1$ is turned on with power $P_L(\lambda_1)$. The power of the optical signal is again measured with optical power meter 112 and optical power meter 122. The loss in the fiber span is again calculated as $L_1 = P_1/P_2$. Due to the gain from the Raman pump laser 102, $L_1$ is smaller than $L_0$. After coupling losses $L_c(\lambda_1)$, the Raman pump power coupled into fiber span 108 is $L_c(\lambda_1)P_L(\lambda_1)$. Theoretically, the Raman gain due to the presence of Raman pump laser 102 is given by the expression:

$$G_1 = \exp[g_{fiber} r(\lambda_{signal} - \lambda_1) L_C(\lambda_1) L_{eff}(\lambda_1)]$$

where $g_{fiber}$ is the power normalized peak Raman gain coefficient of fiber span 108, and $r(\lambda_{signal} - \lambda_1)$ is the relative gain coefficient at the wavelength separation $\lambda_{signal} - \lambda_1$. In practice the value of $G_1 = L_0/L_1$. The power meter measurements provide a value $G_1$ to Raman gain control unit 114. Leff$(\lambda_1)$ is the effective fiber length at wavelength $\lambda_1$, which is calculated as $L_{eff}(\lambda_1) = (1 - \exp(-\alpha(\lambda_1) * L_{fiber}))/\alpha(\lambda_1)$ where $L_{fiber}$ is the length of the fiber span and $\alpha(\lambda_1)$ is the fiber attenuation coefficient at wavelength $\lambda_1$.

The third case occurs as Raman pump laser 102 is turned off and Raman pump laser 104 is turned on, operating at wavelength $\lambda_2$ with power $P_L(\lambda_2)$. The power of the optical signal is again measured with optical power meter 110 and optical power meter 122. The loss in the fiber span is now calculated as $L_2=P_1/P_2$. Due to the gain from the Raman pump laser 104, $L_2$ is smaller than $L_0$. After coupling losses $L_c(\lambda_2)$, the Raman pump power coupled into fiber span 108 is $L_c(\lambda_2)P_L(\lambda_2)$. Theoretically, the Raman gain due to the presence of Raman pump laser 104 is given by the expression:

$$G_2 = \exp[g_{fiber} r(\lambda_{signal}-\lambda_2) L_C(\lambda_2) P_L(\lambda_2) L_{eff}(\lambda_2)]$$

where $g_{fiber}$ is the power normalized peak Raman gain coefficient of fiber span 108, and $r(\lambda_{signal\ -\lambda 2})$ is the relative gain coefficient at the wavelength separation $\lambda_{signal}-\lambda_2$. $L_{eff}(\lambda_2)$ is the effective fiber length at wavelength $\lambda_2$, which is calculated as $L_{eff}(\lambda_2)=(1-\exp(-\alpha(\lambda_2)*L_{fiber}))/\alpha(\lambda_2)$, where $L_{fiber}$ is the length of the fiber span and $\alpha(\lambda_2)$ is the fiber attenuation coefficient at wavelength $\lambda_2$. In practice the value of $G_2=L_0/L_2$. The power meter measurements provide a value $G_2$ to Raman gain control unit 114.

From $G_1$ and $G_2$, Raman gain control unit 114 will now calculate the ratio between the coupling and fiber losses for the two pump wavelengths:

$$\frac{L_{eff}(\lambda_1) L_C(\lambda_1)}{L_{eff}(\lambda_2) L_C(\lambda_2)} = \frac{\ln(G_1)}{\ln(G_2)} \frac{r(\lambda_{signal}-\lambda_1)}{r(\lambda_{signal}-\lambda_2)} \frac{P_L(\lambda_1)}{P_L(\lambda_2)}$$

"r" is the Raman coefficient and is taken as a known value which is independent of fiber type. Raman gain control unit 114 will use this loss ratio to adjust the relative power of Raman pump laser 102 to Raman pump laser 104 to yield a correct power ratio in fiber span 108 to achieve a flat Raman gain spectrum. The optimum ratio of the pump powers is determined based on simulations. These ratios depend on the fiber type, the wavelength range, span lengths and other parameters. The method described is used to ensure that these power ratios are true at the input to the fiber and also takes into account varying wavelength dependent span losses.

As will be clear to one skilled in the art, if it is advantageous produce a tilted Raman gain spectrum, with higher gain at either $\lambda_1$ or $\lambda_2$ then Raman gain control unit 114 can be programmed to adjust the relative powers to provide a tilted Raman gain spectrum. Additional Raman pump lasers and additional G measurements provide additional data to Raman control unit 114 and may be used to provide more complicated Raman spectral gain profiles.

Figure 2:
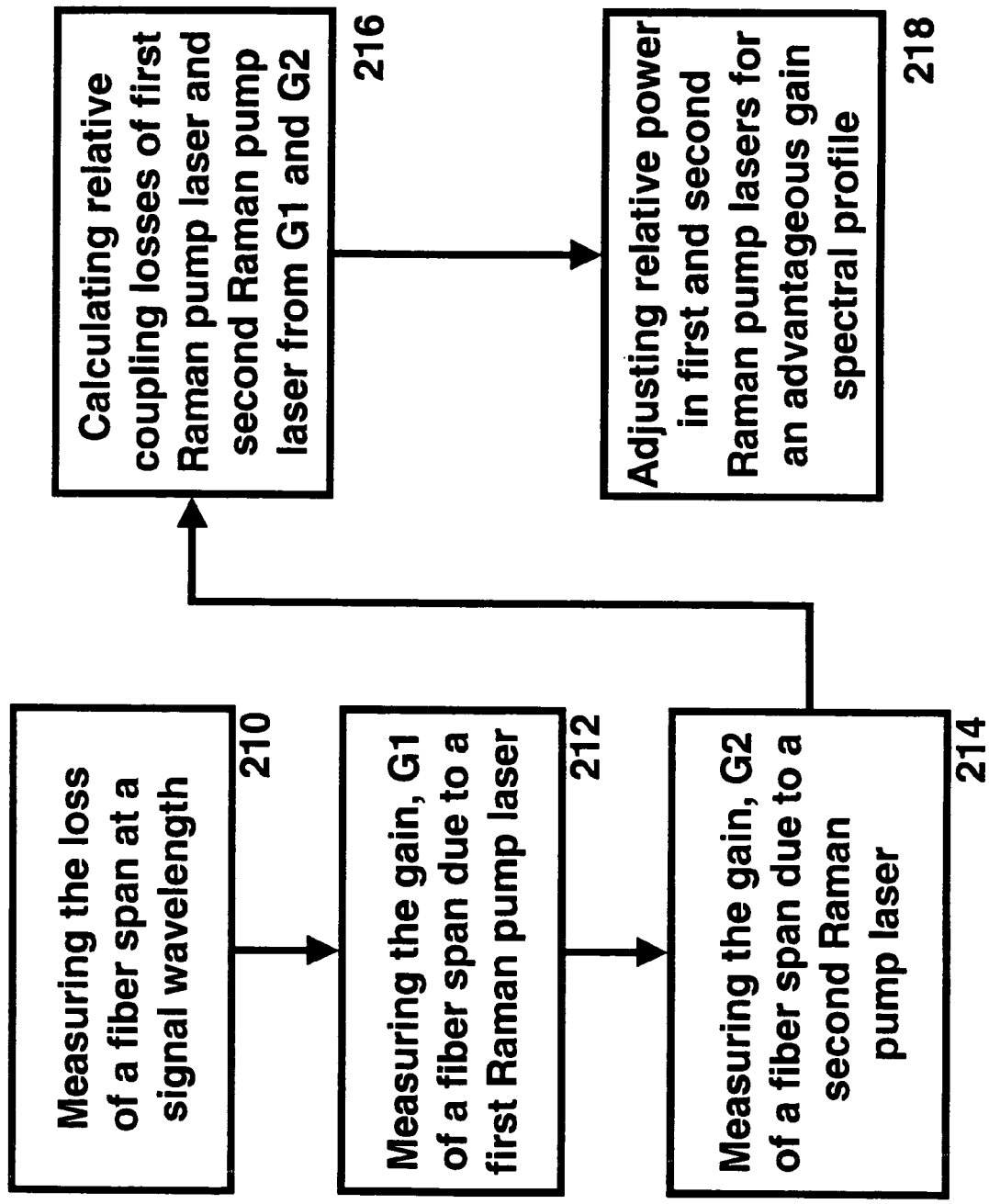
FIG. 2 is a flow chart of a Raman gain control method to achieve an advantageously shaped Raman gain spectral profile.

In FIG. 2 is a flow chart illustrating a method of Raman gain control in accordance with one aspect of the invention. The method comprises a first step 210 of measuring the inherent loss of a fiber span 108 at a signal wavelength. For an optical signal traveling from optical tap 120 to optical tap 110, the inherent loss in the fiber span is equal to $L_0=P_1/P_2$ where $P_2$ is the power as measured in optical power meter 112 and $P_1$ is the power as measured in optical power meter 122. Raman gain control unit 114 is programmed to calculate $L_0$ based on power measurements from optical power meter 112 and optical power meter 122.

The method further comprises a second step 212 of measuring the gain, $G_1$ of a fiber span due to a first Raman pump laser 102. Raman pump laser 102, operating at wavelength $\lambda_1$ is turned on with power $P_L(\lambda_1)$. The power of the optical signal is again measured with optical power meter 112 and optical power meter 122. The loss in the fiber span is now calculated as $L_1=P_1/P_2$. Due to the gain from the Raman pump laser 102, $L_1$ is smaller than $L_0$. After coupling losses $L_c(\lambda_1)$, the Raman pump power coupled into fiber span 108 is $L_c(\lambda_1)P_L(\lambda_1)$. Theoretically, the Raman gain due to the presence of Raman pump laser 102 is given by the expression:

$$G_1 = \exp[g_{fiber} r(\lambda_{signal}-\lambda 1) L_C(\lambda_1) P_L(\lambda_1) L_{eff}(\lambda_1)]$$

where $g_{fiber}$ is the power normalized peak Raman gain coefficient of fiber span 108, and $r(\lambda_{signal-\lambda 1})$ is the relative gain coefficient at the wavelength separation $\lambda_{signal-\lambda 1}$. $L_{eff}(\lambda_1)$ is the effective fiber length at wavelength $\lambda_1$, which is calculated as $L_{eff}(\lambda_1)=(1-\exp(-\alpha(\lambda_1)*L_{fiber}))/\alpha(\lambda_1)$, where $L_{fiber}$ is the length of the fiber span and $\alpha(\lambda_1)$ is the fiber attenuation coefficient at wavelength $\lambda_1$. In practice the value of $G_1=L_0/L_1$. The power meter measurements provide a value $G_1$ to Raman gain control unit 114.

Step 214 of the method entails measuring the gain, $G_2$ of a fiber span due to a second Raman pump laser 104. Raman pump laser 102 is now turned off, and Raman pump laser 104, operating at wavelength $\lambda_2$ is turned on with power $P_L(\lambda_2)$. The power of the optical signal is again measured with optical power meter 112 and optical power meter 122. The loss in the fiber span is now calculated as $L_1=P_1/P_2$. Due to the gain from the Raman pump laser 102, $L_1$ is smaller than $L_0$. After coupling losses $L_c(\lambda_2)$, the Raman pump power coupled into fiber span 108 is $L_c(\lambda_2)P_L(\lambda_2)$. Theoretically, the Raman gain due to the presence of Raman pump laser 104 is given by the expression:

$$G_2 = \exp[g_{fiber} r(\lambda_{signal}-\lambda_2) L_C(\lambda_2) P_L(\lambda_2) L_{eff}(\lambda_2)]$$

where $g_{fiber}$ is the power normalized peak Raman gain coefficient of fiber span 108, and $r(\lambda_{signal}-\lambda_2)$ is the relative gain coefficient at the wavelength separation $\lambda_{signal\ -\lambda 2}$. $L_{eff}(\lambda_2)$ is the effective fiber length at wavelength $\lambda_2$, which is calculated as $L_{eff}(\lambda_2)=(1-\exp(-\alpha(\lambda_2)*L_{fiber}))/\alpha(\lambda_2)$, where $L_{fiber}$ is the length of the fiber span and $\alpha(\lambda_2)$ is the fiber attenuation coefficient at wavelength $\lambda_2$. In practice, $G_2=L_0/L_1$. The power meter measurements provide a value $G_2$ to Raman gain control unit 114.

Step 216 of the method entails Calculating relative coupling losses of first Raman pump laser and second Raman pump laser from $G_1$ and $G_2$. From $G_1$ and $G_2$, Raman gain control unit 114 will now calculate the ratio between the coupling and fiber losses for the two pump wavelengths:

$$\frac{L_{eff}(\lambda_1) L_C(\lambda_1)}{L_{eff}(\lambda_2) L_C(\lambda_2)} = \frac{\ln(G_1)}{\ln(G_2)} \frac{r(\lambda_{signal}-\lambda_1)}{r(\lambda_{signal}-\lambda_2)} \frac{P_L(\lambda_1)}{P_L(\lambda_2)}$$

"r" is the Raman coefficient and is taken as a known value which is independent of fiber type. Step 218 of the method entails Adjusting relative power in first and second Raman pump lasers for an advantageous gain spectral profile. Raman gain control unit 114 will use this loss ratio to adjust the relative power of Raman pump laser 102 to Raman pump laser 104 to yield a correct power ratio in fiber span 108 to achieve a flat Raman gain spectrum. The optimum ratio of the pump powers is determined based on simulations. These ratios depend on the fiber type, the wavelength range, span lengths and other parameters. The method described in the application is used to ensure that these power ratios are true at the input to the fiber and also takes into account varying wavelength dependent span losses.

As will be clear to one skilled in the art, if it is advantageous produce a tilted Raman gain spectrum, with higher gain at either $\lambda_1$ or $\lambda_2$ then Raman gain control unit 114 can be programmed to adjust the relative powers to provide a tilted Raman gain spectrum. Additional Raman pump lasers, and additional G measurements provide additional data to Raman control unit 114 and may be used to provide more complicated Raman spectral gain profiles.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A processor-readable medium having processor-executable instructions that, when executed by a processor, cause the performance of:
    transmitting a first Raman pump signal at a first wavelength in a fiber span via a first Raman pump laser;
    measuring a first gain of an optical signal due to the first Raman pump signal;
    turning off the first Raman pump laser;
    transmitting a second Raman pump signal at a second wavelength in the fiber span via a second Raman pump laser;
    measuring a second gain of the optical signal due to the second Raman pump signal;
    calculating a loss ratio based at least in part on a first coupling loss due to the first Raman pump signal and a second coupling loss due to the second Raman pump signal; and
    adjusting a power of at least one of the first or second Raman pump lasers in accordance with the calculated loss ratio to achieve a desired Raman gain spectrum.

2. The processor-readable medium of claim 1, wherein the desired Raman gain spectrum is predominantly flat across a spectral range.

3. The processor-readable medium of claim 1, wherein the desired Raman gain spectrum is predominantly tilted across a spectral range.

4. The processor-readable medium of claim 1 having further processor-executable instructions for performing automatically adjusting the power of at least one of the first or second Raman pump lasers in accordance with the calculated loss ratio to achieve the desired Raman gain spectrum.

5. The processor-readable medium of claim 1 having further processor-executable instructions for performing measuring at least one power of the optical signal with the first and second Raman pump lasers turned off.

6. The processor-readable medium of claim 5 having further processor-executable instructions for performing calculating a loss associated with the fiber span based on the at least one power measurement.

7. The processor-readable medium of claim 1 having further processor-executable instructions for performing measuring at least one power of the optical signal with the first Raman pump laser turned on and the second Raman pump laser turned off.

8. The processor-readable medium of claim 7 having further processor-executable instructions for performing calculating a loss associated with the fiber span based on the at least one power measurement.

9. The processor-readable medium of claim 1 having further processor-executable instructions for performing measuring at least one power of the optical signal with the first Raman pump laser turned off and the second Raman pump laser turned on.

10. The processor-readable medium of claim 9 having further processor-executable instructions for performing calculating a loss associated with the fiber span based on the at least one power measurement.

11. The processor-readable medium of claim 1, wherein the loss ratio is further based on a first fiber loss associated with the first wavelength and a second fiber loss associated with the second wavelength.

12. The processor-readable medium of claim 1, wherein the optical signal counter-propagates with the first and second Raman pump signals.

13. The processor-readable medium of claim 1, wherein the optical signal co-propagates with the first and second Raman pump signals.

14. A processor-readable medium having processor-executable instructions that, when executed by a processor, cause the performance of:
    measuring a first gain of an optical signal on a fiber span based on a first Raman pump laser;
    measuring a second gain of the optical signal on the fiber span based on a second Raman pump laser;
    calculating a loss ratio based at least in part on a first coupling loss due to the first Raman pump laser and a second coupling loss due to the second Raman pump laser; and
    adjusting at least one of the first and second Raman pump lasers in accordance with the calculated loss ratio to achieve a desired Raman gain spectrum,
    wherein the first gain is measured with the second Raman pump laser turned off and the second gain is measured with the first Raman pump laser turned off.

15. The processor-readable medium of claim 14 having further processor-executable instructions for performing determining the first and second gains based on an inherent loss in the fiber span.

16. The processor-readable medium of claim 14, wherein the adjusting is further based on the fiber span, a wavelength range, or a length of the fiber span.

17. The processor-readable medium of claim 14 having further processor-executable instructions for performing transmitting a first Raman pump signal having a first wavelength and a second Raman pump signal having a second wavelength via the first and second Raman pump lasers, respectively.

18. The processor-readable medium of claim 14 having further processor-executable instructions for performing measuring at least one power of the optical signal with the first and second Raman pump lasers turned off.

19. The processor-readable medium of claim 18 having further processor-executable instructions for performing calculating a loss associated with the fiber span based on the at least one power measurement.

20. The processor-readable medium of claim 14 having further processor-executable instructions for performing measuring at least one power of the optical signal with the first Raman pump laser turned on and the second Raman pump laser turned off.

21. The processor-readable medium of claim 20 having further processor-executable instructions for performing calculating a loss associated with the fiber span based on the at least one power measurement.

22. The processor-readable medium of claim 14 having further processor-executable instructions for performing measuring at least one power of the optical signal with the first Raman pump laser turned off and the second Raman pump laser turned on.

23. The processor-readable medium of claim 22 having further processor-executable instructions for performing calculating a loss associated with the fiber span based on the at least one power measurement.

24. The processor-readable medium of claim 14 wherein the loss ratio is further based on a first fiber loss associated with the first Raman pump laser and a second fiber loss associated with the second Raman pump laser.

25. A processor-readable medium having processor-executable instructions that, when executed by a processor, cause the performance of:
measuring a first loss associated with an optical signal with a first Raman pump laser and a second Raman pump laser turned off;
measuring a second loss associated with the optical signal with the first Raman pump laser turned on and the second Raman pump laser turned off;
measuring a third loss associated with the optical signal with the first Raman pump laser turned off and the second Raman pump laser turned on;
calculating a loss ratio based at least in part on the first, second and third measured losses; and
adjusting at least one of the first or second Raman pump lasers in accordance with the calculated loss ratio to achieve a desired Raman gain spectrum.

26. The processor-readable medium of claim 25 having further processor-executable instructions for performing calculating a gain of the first Raman pump laser based on the first and second measured losses.

27. The processor-readable medium of claim 25 having further processor-executable instructions for performing calculating a gain of the second Raman pump laser based on the first and third measured losses.

28. The processor-readable medium of claim 25 having further processor-executable instructions for performing transmitting a first Raman pump signal at a first wavelength via the first Raman pump laser and transmitting a second Raman pump signal at a second wavelength via the second Raman pump laser.

29. The processor-readable medium of claim 25, wherein the first, second and third measured losses are each measured via a first power meter and a second power meter, and wherein the first and second power meters are located at a first end and a second end of a fiber span, respectively.

* * * * *